Figure 1:
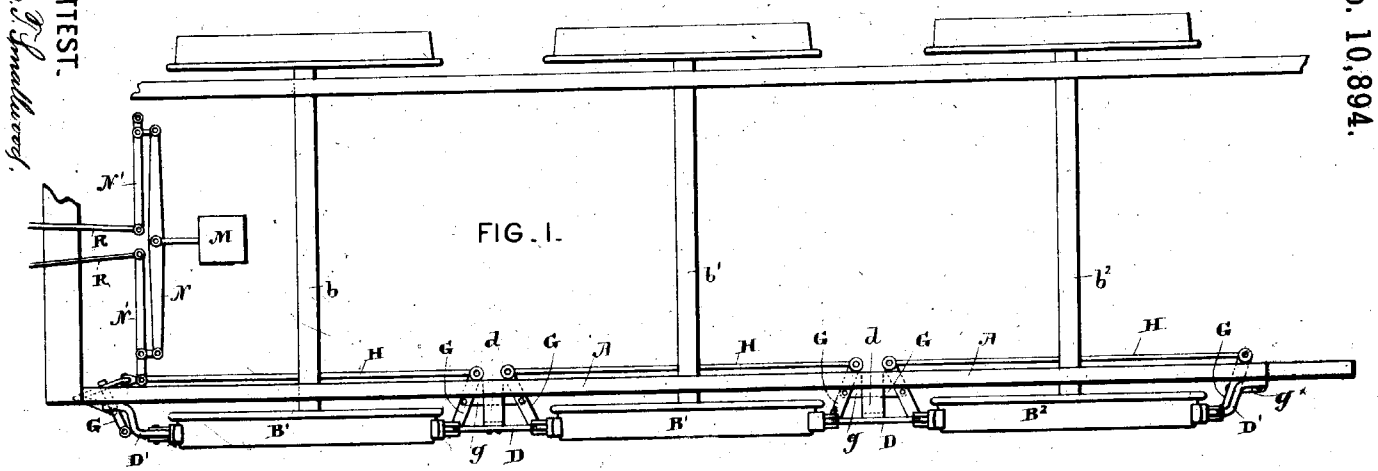

E. BEALS.

Assignor to J. M. GUERNSEY.

LOCOMOTIVE BRAKE.

No. 10,894. Reissued Jan. 17, 1888.

ATTEST.

Geo. T. Smallwood.

J. Henry Kaiser.

INVENTOR.

Ebenezer Beals

By Knight Bros.

Attys.

3 Sheets—Sheet 2.

E. BEALS.

Assignor to J. M. GUERNSEY.

LOCOMOTIVE BRAKE.

No. 10,894. Reissued Jan. 17, 1888.

ATTEST.

Geo. T. Smallwood.

J. Henry Kaiser.

INVENTOR.

Ebenezer Beals.

By Knight Bros.

Atty.

3 Sheets—Sheet 3.

E. BEALS.

Assignor to J. M. GUERNSEY.

LOCOMOTIVE BRAKE.

No. 10,894. Reissued Jan. 17, 1888.

ATTEST.

Geo. T. Smallwood.

J. Henry Kaiser.

INVENTOR.

Ebenezer Beals.

By Knight Bros

Attys

UNITED STATES PATENT OFFICE.

EBENEZER BEALS, OF NORWICH, NEW YORK, ASSIGNOR TO JANE M. GUERNSEY, OF SAME PLACE.

LOCOMOTIVE-BRAKE.

SPECIFICATION forming part of Reissued Letters Patent No. 10,894, dated January 17, 1888.

Original No. 271,189, dated January 23, 1883. Application for reissue filed November 1, 1883. Serial No. 110,592.

*To all whom it may concern:*

Be it known that I, EBENEZER BEALS, a citizen of the United States, residing at Norwich, in the county of Chenango and State of New York, have invented an Improved Locomotive-Brake, of which the following is a specification.

My invention relates to that class of brakes which are applicable to railway locomotive-engines.

The object of my invention is the provision of a brake system for locomotives which shall secure a uniform and equal pressure of the brake-shoes upon the driving-wheels, the shoes being arranged one on either side of each wheel, and which is capable of indefinite extension by simple duplication, so as to operate upon any given number of wheels.

In locomotives the brake-pressure cannot be distributed to wheels on both sides of the vehicle through a single line of transmission, as is usual with car-brakes, and as the number of driving-wheels on a locomotive on each side vary from two to four, and all upon a side are rigidly connected longitudinally by connecting rods and pins, it is evident that an excess of brake-pressure upon one of said wheels must result in a blow or strain upon the rods and pins, and that, also, if the braking pressure be not equalized upon opposite sides of each wheel, as well as between all the wheels, its thrust will be opposed to the stress of the connecting-rod, with resultant danger of locking and consequent flattening of the wheels, and with certainty of unequal wear of boxes and brasses. To avoid these defects a series of rock arms or levers bearing the brake-shoes are, in the present apparatus, arranged one at each side of each of the connected wheels, (regardless of the number of said wheels,) and floating levers and connecting-rods are provided, by which to transmit power from a motor or motors longitudinally and in parallel lines to each of the two lateral series of wheels, thus distributing the pressure in equal increments to each and every brake-shoe.

In order that my invention may be fully understood, I will describe it with reference to the accompanying drawings, in which—

Figure 2:
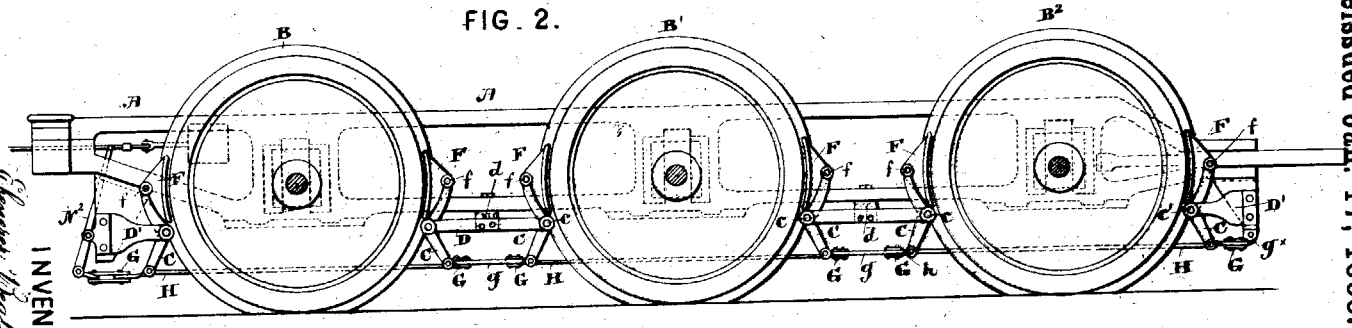
Figure 3:
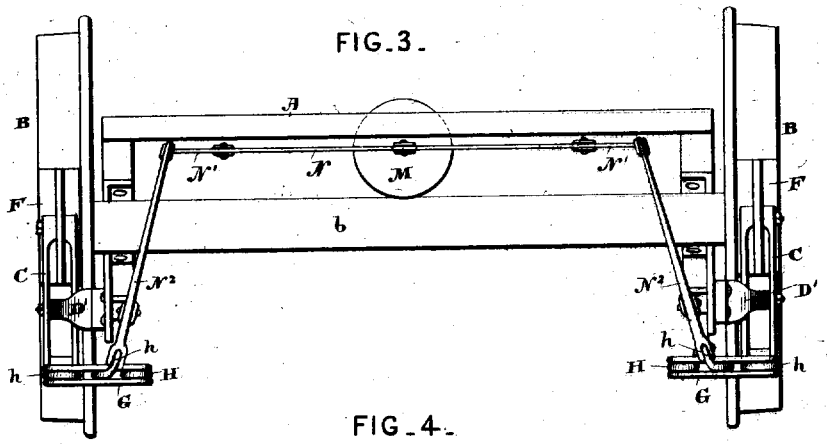
Figure 4:
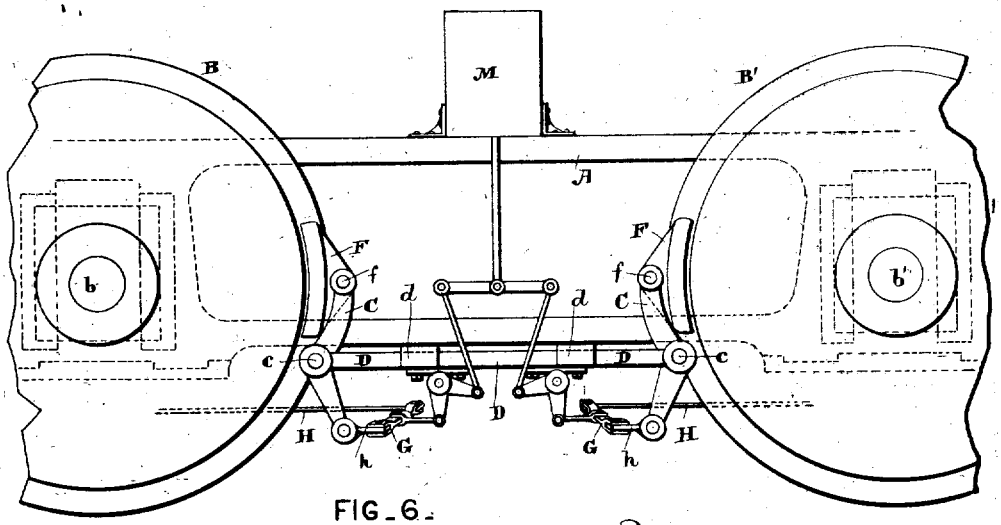
Figure 6:
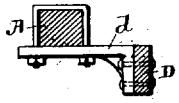
Figure 9:
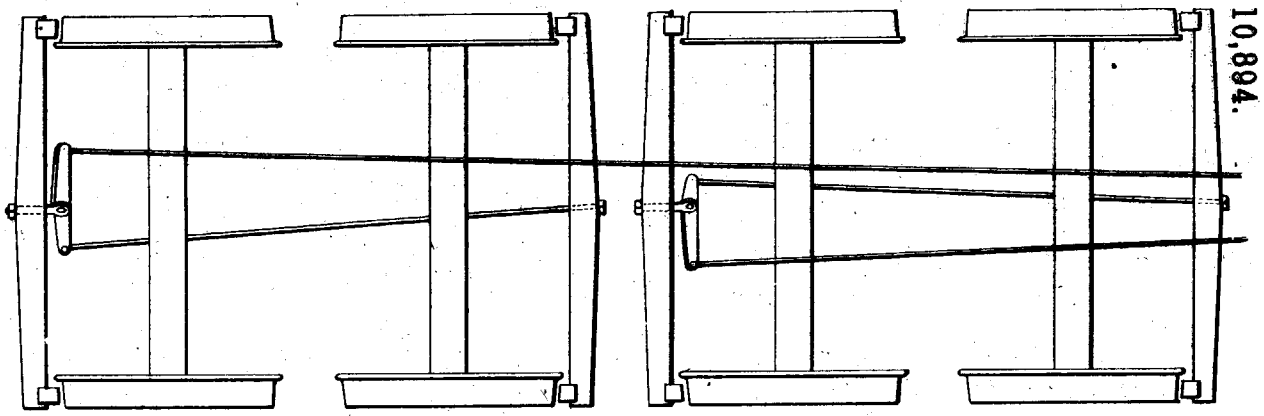
Figure 10:
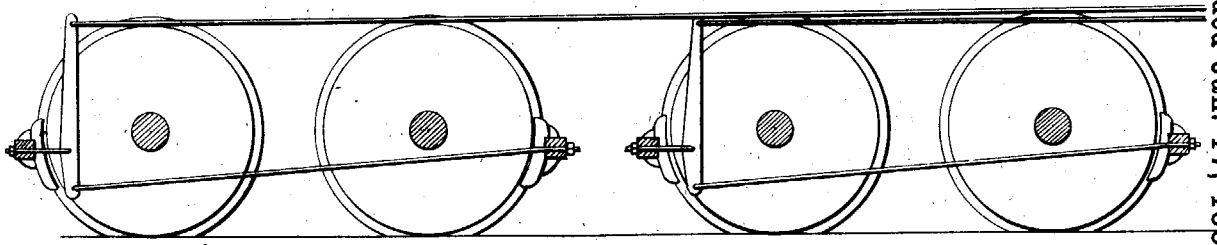

Figure 1 is a plan view of a locomotive frame, showing my invention applied to one side thereof. Fig. 2 is a side elevation of the same. Fig. 3 is an end view thereof. Fig. 4 is a side view illustrating a modification in the way of applying power. Figs. 5, 6, 7, and 8 are views of parts of the mechanism on a larger scale. Figs. 9 and 10 are respectively a plan and a side view of parts of a tender-frame, showing the connections with the brake system represented in Figs. 1 and 2.

A represents a part of the frame of a "Mogul" locomotive.

B B′ B² are the driving-wheels of a lateral series which in practice are connected by rods. (Not here shown.)

*b b′ b²* are the axles of the driving-wheels.

Figure 5:
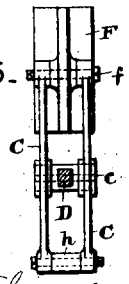
Figure 7:
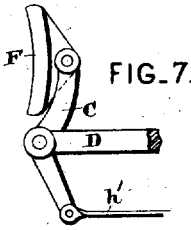
Figure 8:
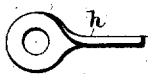

Rock-arms C, made in two parts, as shown in Fig. 5, are arranged on each side of each driver, and each rock-arm carries a brake-shoe, F, at its upper end. These shoes F are each swiveled at *f* upon a bolt or pin, which is to be constructed and adjusted so as to pinch the shoe-lug between the two sides of the rock-arm C sufficiently to prevent clattering. The rock-arms C are themselves swiveled or fulcrumed each at *c c′* in fulcrum-plates D D′, the fulcrum-plates D, located between the wheels, being double-ended, and the fulcrum-plates D′ at the ends single-ended. These plates are attached to the frame in any convenient manner. In the detail Fig. 6 the double plates are shown attached by brackets *d*, while the end plates are bent and bolted to attachments fastened to the frame for the purpose. All these fulcrums are in plane with the center of the wheel-treads, and are nearer to the vertical planes of the respective axles than are the shoe-fulcrums *f*. This arrangement, together with the shape of the rock-arm, causes the weight of the shoes and of the floating levers to aid the withdrawal of the shoes from contact with the wheel-treads. The lower end of each rock-arm is connected by a link, *h*, to one end of a floating lever, G. The inner end of each floating lever is connected by a tie, H, to the corresponding end of the floating lever upon the opposite side of the same wheel, passing behind the wheel and below the frame. The floating levers that are between the two wheels afford a fulcrum to each other at *g*.

It will be seen that any desired extension can be given to the system by a simple duplication of the parts. The floating levers and ties may be supported from any convenient part of the frame or attachments by hangers; but if the link *h* be formed as shown in detail in Figs. 7 and 8 no hanger will be necessary. Therefore none is shown. A pull from the motor M, applied through suitable intermediate levers, N N′ N², to either of the terminal floating levers, the opposite one being anchored to the frame, as at $g^{\times}$, will effect an application of each brake-shoe of the system with a pressure exactly equal to that of each of the others. Rods R′R connect the levers N′ N′ with an ordinary brake system on the running-gear of the tender, as shown in Figs. 1, 2, 9, and 10, the levers N′ being proportioned to apply the proper relative pressure to the brakes of the locomotive and tender, respectively, and to interfulcrum the said two brake systems. It being desirable to apply the brake-pressures as nearly as may be in a line with the wheel-centers, and the "pull-line" being necessarily below the axles, the rock-arms are used to shift the plane of stress upward, the floating levers effecting a similar shifting outward from the pull-line (situate longitudinally between the wheels) to the line of the wheel-treads.

It is not necessary that the power should be applied at a terminal. In Fig. 4 the invention is shown with power applied between two central floating levers with the same effect as that before described. Therefore I do not confine myself to any special location of motor; nor do I prescribe a special kind of motor; nor am I limited to the use of a single nor yet to a double motor or duplicate motors.

If desired, alternative motors may be used, as a steam-cylinder and a hand-windlass adapted for optional use. The motor may be placed anywhere in the car, or under it, on the tender, or at each side of the locomotive, as illustrated in Fig. 4, or under the forward part of the boiler—in fact, wherever most convenient—since transmitting tie-rods and levers can readily be arranged to transmit motion and pressure from the source of power to the brake system, as also from the same source of power to the brakes of the tender. The rock-arms in the drawings are all levers of the first order. They as well as the floating levers may be of any of the three orders without affecting the principle of the invention. So, also, power may be transmitted through the ties by thrust as well as by tension. The link *h* is readily formed by punching or drilling bolt-holes in the ends of a piece of metal of suitable dimension, and giving to said metal between the said holes a quarter or other amount of twist, so as to bring the axis of the said holes at right angles or at any desired angle to each other.

It will be seen that the distinguishing features of my invention are, first, dispensing with brake-beams; second, use of floating levers to transfer brake-pressure from interior pull-lines to the line of wheel-treads, and to accomplish the desired distribution and equalization of brake-pressure from a single motor to each side of each of any number of drivers, and to interfulcrum each brake-shoe with every other and the locomotive with the tank system, and, third, the use of rock-arms to elevate the pressure above the pull-line.

Having thus described my invention, what I claim as new therein, and desire to secure by Letters Patent, is—

1. The combination, with the rock-arms, of fulcrum-plates attached to the locomotive-frame and affording centers or fulcrums for the said rock-arms at points in the plane of the wheel-treads below the horizontal plane of the axles and nearer their respective vertical planes than are the shoe-centers *f*.

2. A brake system having shoes bearing on opposite sides of each wheel, operated by pull-lines behind the wheels and below the axles, and arranged in a series indefinitely extensible, so as to operate on any number of wheels, and interfulcrumed, so that each shoe constitutes a fulcrum for all the rest of the series, substantially as herein set forth.

3. In a locomotive-brake, a connected series of brake-shoes distributed and bearing with self-equalizing pressure one upon each side of each driving-wheel and actuated by lines of connection passing behind the wheels and below their axles.

4. A locomotive-brake having a series of brake-shoes on each side of the locomotive bearing with self-equalizing pressure on both sides of each of the respective driving-wheels and operated by separate longitudinal pull-lines passing between the wheels and below their axles.

5. A locomotive-brake having separate interior pull-lines on its respective sides, and floating levers operating to transfer equalized and interfulcrumed pressure to an indefinite number of brake-shoes situate in the line of the wheel-treads.

6. A locomotive-brake having interior pull-lines situate below the axles, floating levers to transfer the power to the plane of the wheel-treads, and rock-arms to elevate the plane of shoe-pressure above that of the pull-line.

7. The combination of the motor M, levers N N′ N², connecting-links *h*, ties H, floating levers G, rock-arms C, and brake-shoes F, the whole operating, substantially as herein described, to apply uniform or equalized pressure to an indefinite number of driving-wheels.

EBENEZER BEALS.

Witnesses:
W. B. GUERNSEY,
W. C. DEDRICK.